United States Patent [19]

Sugiura et al.

[11] Patent Number: 5,497,315

[45] Date of Patent: Mar. 5, 1996

[54] PROGRAMMING DEVICE FOR PROGRAMMABLE SEQUENCE CONTROLLERS

[75] Inventors: Kenro Sugiura, Takahama; Teiji Uno, Chiryu, both of Japan

[73] Assignee: Toyoda Koki Kabushiki Kaisha, Kariya, Japan

[21] Appl. No.: 201,856

[22] Filed: Feb. 25, 1994

[30] Foreign Application Priority Data

Feb. 26, 1993 [JP] Japan .................................. 5-062590
Feb. 26, 1993 [JP] Japan .................................. 5-062591

[51] Int. Cl.⁶ .................................................. G05B 11/01
[52] U.S. Cl. ............................. 364/140; 364/146; 364/147
[58] Field of Search ................................... 364/140–147, 364/188–193

[56] References Cited

U.S. PATENT DOCUMENTS 4,663,704  5/1987  Jones et al. .............................. 364/188
5,113,359  5/1992  Kiya et al. ............................... 364/147
5,168,441  12/1992 Onarheim et al. ....................... 364/146
5,267,145  11/1993 Zifferer et al. .......................... 364/191

*Primary Examiner*—James P. Trammell
*Attorney, Agent, or Firm*—Oblon, Spivak, McClelland, Maier & Neustadt

[57] ABSTRACT

A programming device for preparing a sequence control program to be executed by a programmable sequence controller comprises designation means for designating input and output (I/O) elements specified in the sequence control program which are to be fixed to ON or OFF states regardless of the actual ON or OFF states of the designated I/O elements, fixed I/O element converting means for converting the address of each of the I/O elements designated to be fixed by the designation means into either a memory storing address ON-state or another memory address storing OFF-state so as thereby to prepare a modified sequence control program, and loading means for loading the modified sequence control program to the programmable sequence controller being connected to the programming device.

6 Claims, 10 Drawing Sheets

FIGURE 5

LINK PARAMETER

| LINK START ADDRESS | L 0 0 0 |
|---|---|
| TRANSMISSION BIT NUMBER | 1 0 |
| RECEPTION BIT NUMBER | 2 0 |
| RECEPTION BIT NUMBER | 1 0 |
| ⋮ | ⋮ |

FIGURE 7

| CODE OF FIXED I/O ELEMENT | FIXED STATE |
|---|---|
| M 1 2 3 | ON "1" |
| X 1 5 0 | ON "1" |
| M 2 0 0 | OFF "0" |
| L 0 1 4 | ON "1" |
| L 0 1 6 | OFF "0" |
| ⋮ | ⋮ |
| L 1 0 0 | ON "1" |

PROGRAMMING DEVICE FOR PROGRAMMABLE SEQUENCE CONTROLLERS

BACKGROUND OF THE INVENTION

1. Field of the Invention

The present invention relates to an improved programming device for programmable sequence controllers (hereinafter abbreviated as "sequencers") for controlling various types of industrial machinery such as, for example, machine tools. More particularly, the present invention relates to an improved programming device which is capable of easily preparing a sequence control program used in testing or maintaining one or several sequencers of those sequencers to be interconnected in a link system.

2. Discussion of the Prior Art

Heretofore, a system has been known wherein a plurality of sequencers are connected to a link line and wherein a certain sequencer is controlled in a relation interlocked with another sequencer by reference to the states of input and output (hereafter, simply as "I/O") elements belonging to such another sequencer.

In such a system, each sequencer transmits the states of its I/O elements inquired for from another sequencer to the same via the link line. On the other hand, the another sequencer receiving the states of the I/O elements stores the states in its link element memory which is accessible like a memory storing the states of those I/O elements belonging to the another sequencer itself. Therefore, each sequencer makes access to its link element memory when, in accordance with a sequence control program, executing the inquiry for the states of the I/O elements belonging to another sequencer.

However, the system is not necessarily operated with all the sequencers in the system being interconnected by the link line. For example, it is often the case that the system is operated with a certain sequencer not being interconnected for some reason, or that the operating states of the system are verified or checked with a certain sequencer being not linked to the system for the purpose of system maintenance or trial system operation or for the purpose of partially operating the system in the course of building up the system.

In such case, the states of the I/O elements belonging to a sequencer which is not being interconnected with the link line or not being supplied with electric power, cannot be transmitted to any other sequencers through the link line, so that the states of those addresses of the link element memory which are assigned to such non-connected or off-powered sequencer are uncertain for such any other sequencers. However, the sequence control program for each sequencer is prepared as if all the sequencers were interconnected. Because each sequencer makes access to the addresses of its link element memory assigned to the non-connected or off-powered sequencer like those addresses of its memory storing the states of I/O elements belonging to itself and because the states of the addresses assigned to the non-connected or off-powered sequencer are uncertain, such each sequencer cannot execute the sequence control program as designed therefor.

Therefore, where the system is operated without a certain sequencer therewithin being interconnected, it is necessary for the operator to temporarily modify the sequence control programs of those sequencers which inquire for the states of the I/O elements belonging to the non-connected or off-powered sequencer. After the trial operation or maintenance of the system, the modified sequence control programs have to be restored as they were when the system is subsequently to be operated with all the sequencers within the system being in operation. The restoration of the modified programs requires great efforts and much time. Although other measures may be taken for temporarily operating the system without modifying the sequence control programs, such other measure require temporarily changing the wirings corresponding to those I/O elements for which inquires are made from another sequencer and which are of the sequencer being not linked, in order to fix the states of those I/O elements.

Further, in a system wherein a plurality of sequencers are not linked, namely in that wherein a sole sequencer is used, it may be the case or required to fix certain I/O elements to either ON or OFF state for maintenance or test purpose. In such a case, an original sequence control program in which any modification is not made that makes a certain I/O element assumed as if it is fixed to either of ON or OFF state, must be maintained for normal system operation. In addition, where certain I/O elements are set to the fixed states, unless such is visibly displayed for the operator to understand, difficulties may arise in analyzing the operations according to the sequence control program.

SUMMARY OF THE INVENTION

Accordingly, it is a primary object of the present invention to provide an improved programming device capable of facilitating the preparation of a sequence control program for use in trial operation, partial operation or maintenance of a system which has one or more sequencers interconnected.

It is another object of the present invention to provide an improved programming device which is particularly designed for use in a system including a plurality of sequencers and which is capable of facilitating the preparation of a sequence control program for use in executing trial operation, partial operation or maintenance of the system with some of the sequencers being not linked with other sequencers or being in off-powered state.

It is a further object of the present invention to provide an improved programming device of capable of displaying a ladder diagram for a sequence control program in such a way enabling the operator to visibly recognize that the states of certain I/O elements have been fixed.

Briefly, according to the present invention, there is provided a programming device for preparing a modified sequence control program from an original sequence control program, the programming device comprising: a first program memory for storing the original sequence control program, display means for displaying sequence control programs in the form of a ladder diagram, program read-out means for reading out the original sequence control programs from the first program memory for displaying them on the display means, designation means for enabling the operator to designate an I/O element and to fix the state of the I/O element either ON or OFF state so as to prepare the modified sequence control program and second program memory for storing the modified sequence control program.

With this configuration, the operator merely designates the I/O elements whose states are to be fixed and as a consequence, the modified sequence control program can be easily and speedy prepared for use in operating the sequencer for test or maintenance purpose. Moreover, since the original sequence control program used for full-scale operation of the system is maintained as it is, the restoration of the modified sequence control program to the original is not required prior to the full-scale operation of the system.

In another aspect of the present invention, graphic symbols representing the fixed states of I/O elements designated by the designation means are displayed along with those graphic symbols representing the states of other non-fixed I/O elements in the form of a ladder diagram. This enables the operator to easily distinguish that the I/O elements in the sequence control program whose states have been fixed, from those I/O elements whose states have not been fixed. Accordingly, it becomes easy for the operator to analyze the operations according to the sequence control program.

BRIEF DESCRIPTION OF THE ACCOMPANYING DRAWINGS

Various other objects, features and many of the attendant advantages of the present invention will be readily appreciated as the same becomes better understood by reference to the following detailed description of a preferred embodiment when considered in connection with the accompanying drawings, in which:

FIG. 5 is a link parameter table used for data transmission between the sequencers;

FIG. 7 is a fixed I/O element designation table stored in a RAM shown in FIG. 1;

DETAILED DESCRIPTION OF THE PREFERRED EMBODIMENT

Figure 2:
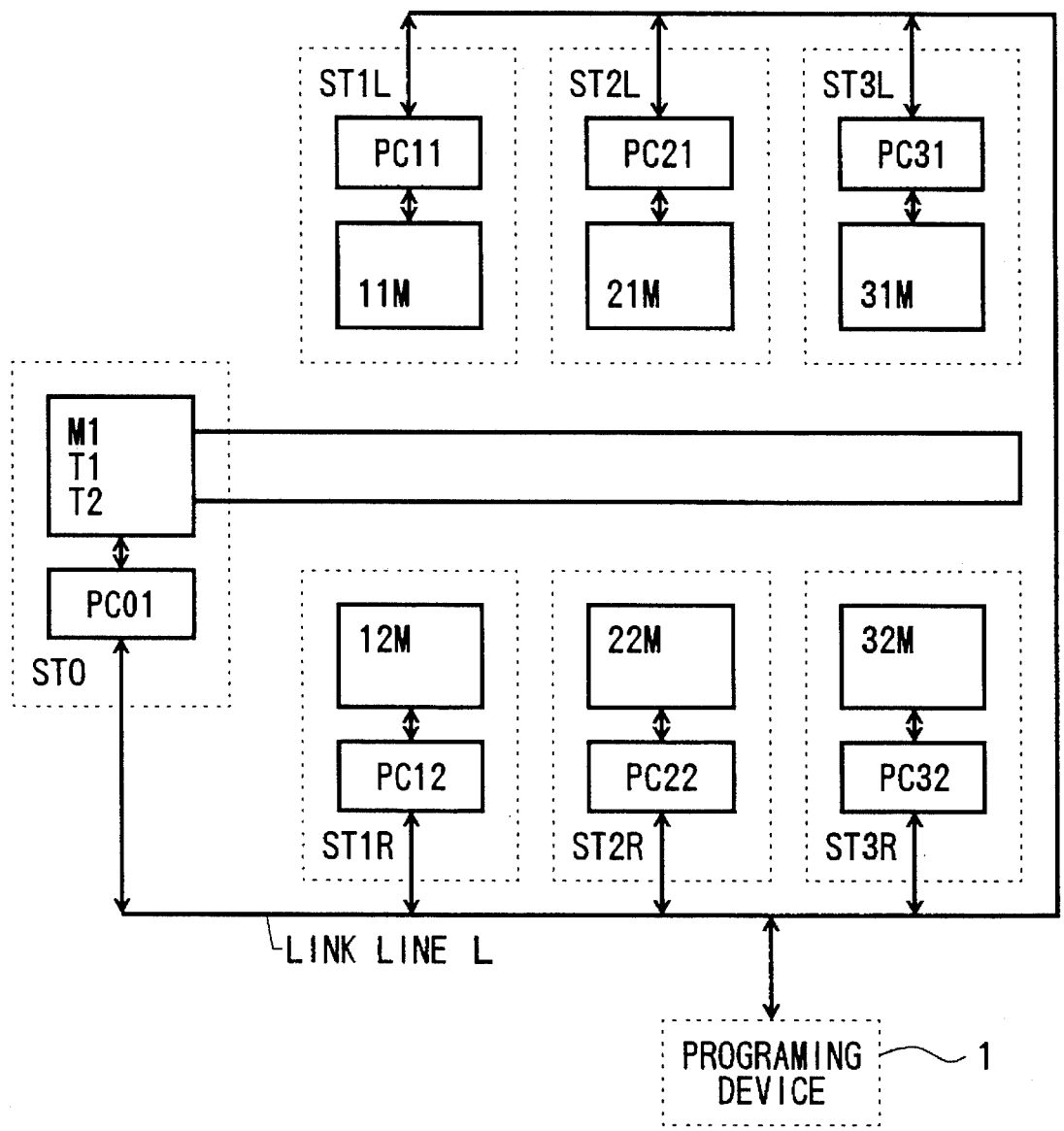
FIG. 2 is a block diagram showing the construction of a transfer machine using a plurality of sequencers.

Referring to the drawings and particularly to FIG. 2 thereof, a transfer machine is shown having stations ST0, ST1L, ST1R, ST2L, ST2R, ST3L and ST3R which are controlled by sequencers PC01, PC11, PC12, PC21, PC22, PC31 and PC32, respectively. The sequencers PC01 to PC32 are interconnected by a link line L. A transfer device M1 and cutting machines 11M, 12M, 21M, 22M, 31M and 32M are installed at a station ST0 and stations ST1L to ST3R, respectively.

Figure 1:
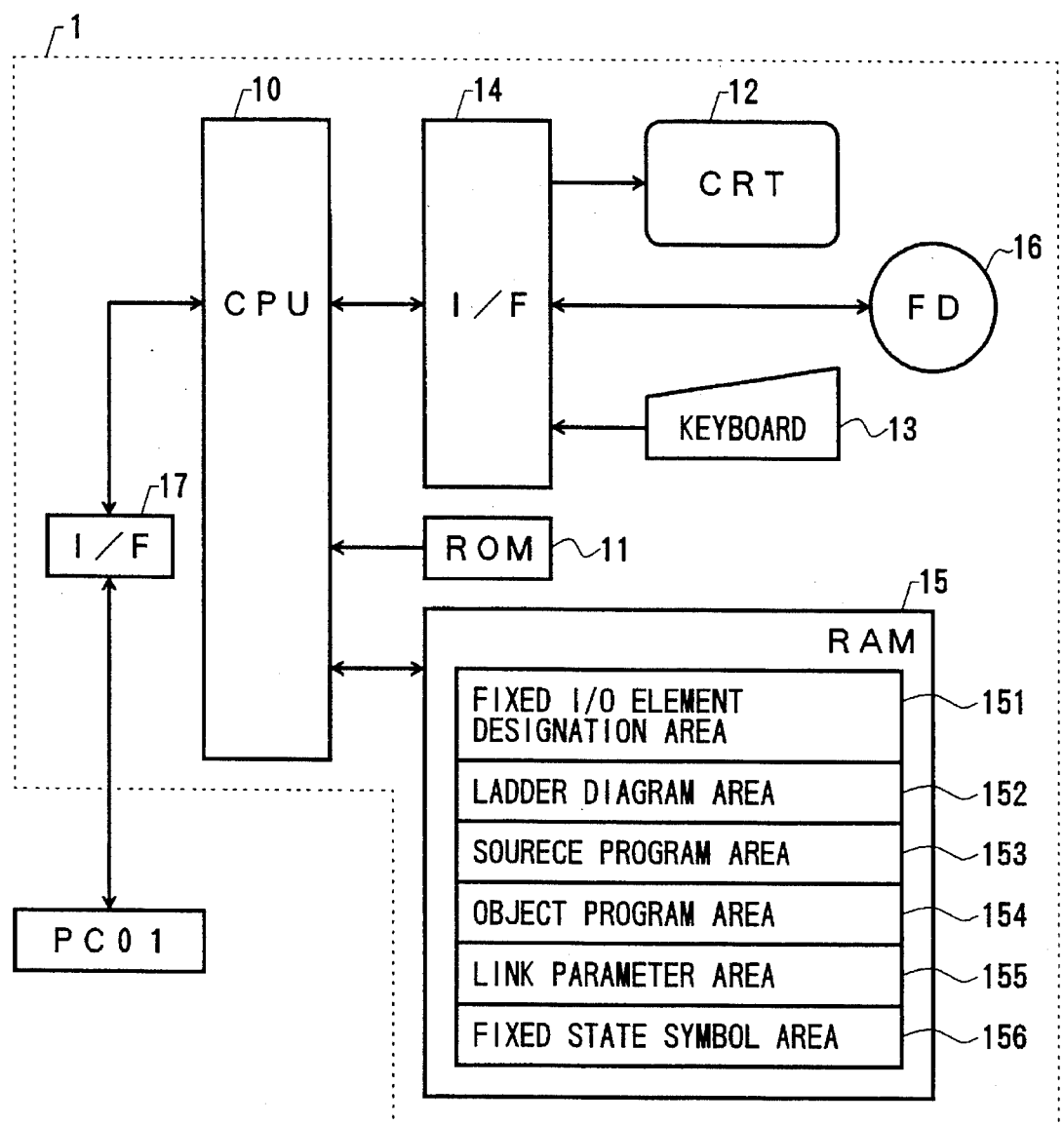
FIG. 1 is a block diagram of a programming device in a preferred embodiment according to the present invention.

FIG. 1 shows a block diagram of the concrete construction of a programming device 1 in the embodiment. The programming device 1 comprises a CPU 10 for controlling the preparation, modification and display of a sequence control program and a corresponding ladder diagram, for designating I/O elements and their states to be fixed and for automatically converting the sequence control program into a modified one, a ROM 11 storing programs for executing the above-mentioned processings, a CRT 12 for displaying the sequence control program and the states of the I/O elements, a keyboard 13 for inputting symbolic data of the I/O elements constituting the sequence control program, data designating the I/O elements and their states to be fixed and various other commands, an interface 14 existing between the CPU 10 and both of the CRT 12 and the keyboard 13, a RAM 15 for storing a source program and an object program corresponding to the sequence control program, a floppy disk device 16 for storing in a floppy disk the source program to be memorized in the RAM 15, and an interface 17 for enabling the programming device 1 to be connected with any of the sequencers, e.g., PC01 or the link line L. All of the sequence control programs used by all the sequencers are memorized in the floppy disk in the form of ladder circuit diagram, source program and object program. The RAM 15 is formed therein with a fixed I/O element designation area 151 for storing designated fixed I/O elements and their states in the form of a table, a ladder diagram area 152 for storing the sequence control program in the form of data depicting a corresponding ladder diagram, a source program area 153 for storing the source program corresponding to the sequence control program, an object program area 154 for storing the object program which enables the sequencer to execute the sequence control program, a link parameter area 155 for storing link parameters, and a fixed state symbol area 156 for storing symbols for various types of I/O elements and state symbols corresponding to two fixed states thereof.

Figure 3:
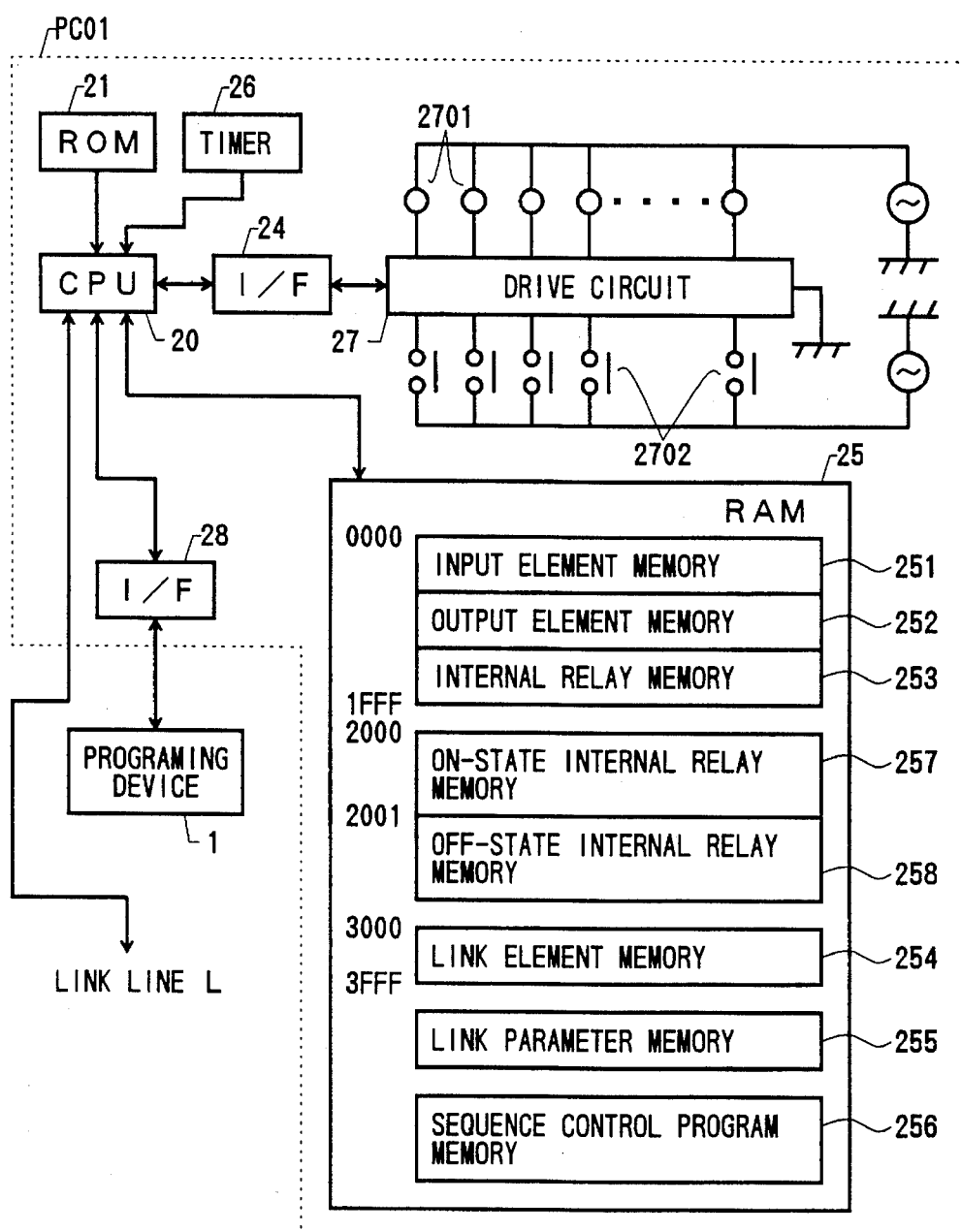
FIG. 3 is a block diagram typically showing, by a sequencer PC01, the construction of each of the sequencers in FIG. 2.

As shown in FIG. 3, each sequencer, e.g., PC01, comprises a CPU 20 for controlling sequence control operation and data communication, a RAM 25 for storing the sequence control program in the form of the object program, link parameters, the states of I/O elements to be controlled and the states of link elements received from the link line L, and a ROM 21 storing programs for controlling the CPU 20 to execute the various processings. For example, I/O elements "2702" and "2701" etc. are controlled by the CPU 20 through a drive circuit 27 and an interface 24. The RAM 25 is formed therein with input and output element state memories 251, 252 for respectively storing the states of the I/O elements belonging to the sequencer PC01 itself, an internal relay memory 253, a link element memory 254, a link parameter memory 255, and a sequence control program memory 256. Further, an ON-state internal relay memory 257 storing an ON-state "1" is formed at address "2000" following the internal relay memory 253, and an OFF-state internal relay memory 258 storing an OFF-state "0" is formed at an address "2001" successive thereto. The object program corresponding to the sequence control program is stored at the sequence control program memory 256. Further, the internal relay memory 253 is used to constitute temporary relays for temporarily holding the commanded states of output elements (i.e., for acting as so-called "holding circuit").

In the RAM 25, memory addresses "0000" through "1FFF" are assigned to the I/O elements belonging to the sequencer PC01 itself, and the states of the I/O elements are recognized by reference to the contents of these addresses. Further, memory addresses "3000" through "3FFF" are common to all of the sequencers PCs and assigned to the I/O elements inquired for from other sequencers PCs in the system. Hereinafter, dummy I/O elements assigned to the common addresses will be called as "link elements" and the addresses "3000" through "3FFF" will be called as "link element memory".

Where all of the sequencers PCs are interconnected with the link line L and are in operation, the contents of the link element memory 254 in all of the sequencers PCs are maintained identical with one another as a result of data communication performed at intervals of microseconds order. Therefore, when a certain one of the sequencers PCs is to inquire for the states of I/O elements belonging to another sequencer, it can identify the states of the I/O elements by looking up the content of the link element memory 254 belonging to itself.

Figure 4:
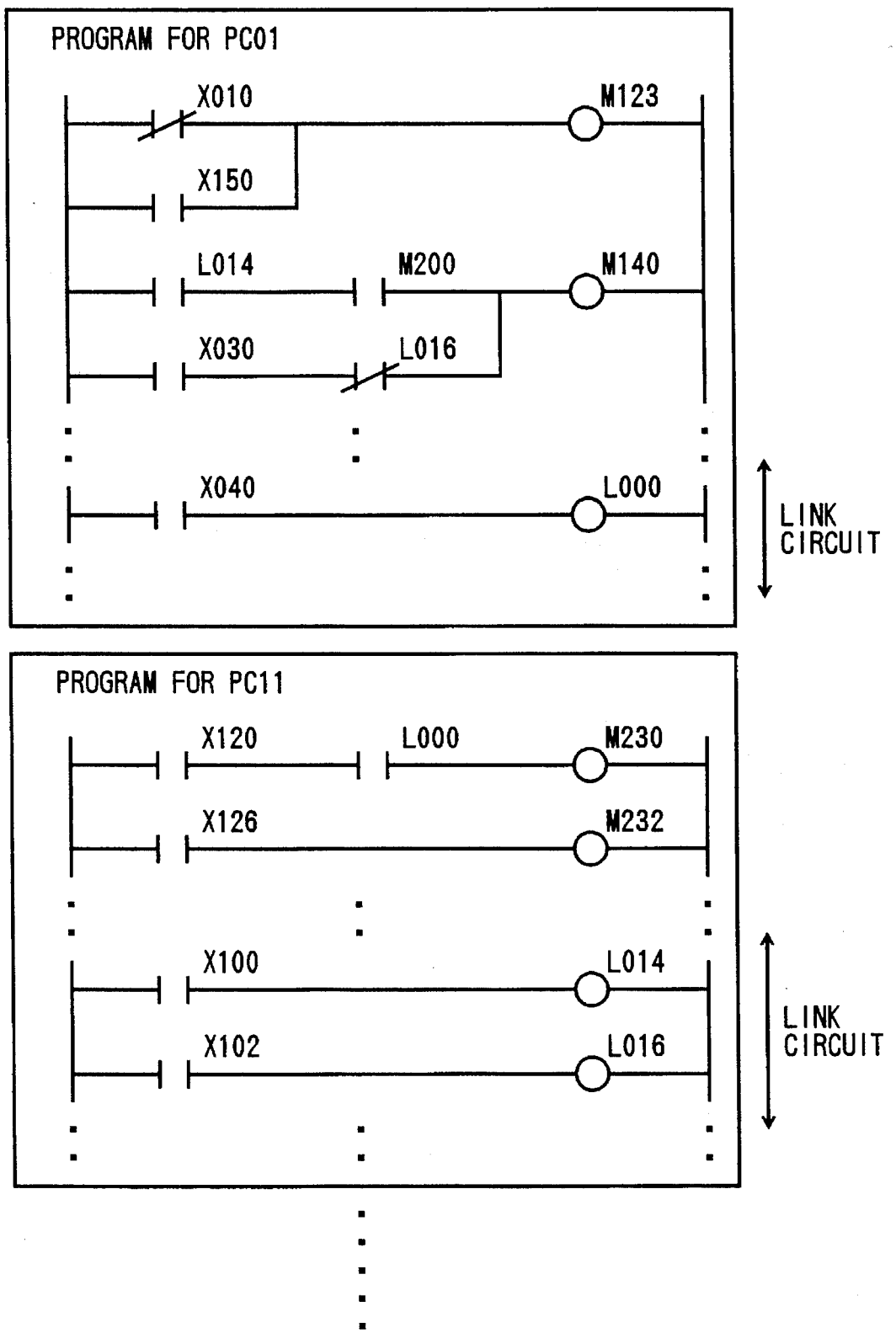
FIG. 4 is a ladder circuit diagram embodied by a sequence control program typically for the sequencer PC01.

The operator prepares a sequence control program for each sequencer in the form of a corresponding ladder diagram by reference to a blue print illustrating a ladder circuit as shown in FIG. 4. In the ladder circuit diagram shown in FIG. 4, input elements are represented by relay or limit switch contacts, and output elements are represented by relay coils and the like.

As shown in FIG. 4, each I/O element has a code inclusive of a memory address which enables the sequencer to look up the state of such each I/O element. For example, the code "X010" used in each sequencer represents an input element assigned to an address "0010" belonging to such a sequencer itself. The code "L000" used in a sequencer represents a link element which is assigned to an address "3000" of such a sequencer itself and which is a dummy I/O element maintaining the same state as an I/O element belonging to another sequencer.

For example, in the case that an input element with the code "X040" which belongs to the sequencer PC01 is an input element for a sequence control program executed by the sequencer PC11, the sequence control program of the sequencer PC01 is provided with commands acting as a link circuit which makes a link element "L000" represent the same state as the input element "X040". Then, the state of the link element "L000" is written into the addresses "3000" of the link element memories 254 of all other sequencers through the data communication. Therefore, the sequencer PC11 can know the state of the input element "X040" belonging to the sequencer PC01 by looking up the state of the address "3000" in its link element memory 254 in accordance with the sequence control program given thereto.

In reverse, in the case that the input element "X100" belonging to the sequencer PC11 is an input element for the sequence control program executed by the sequencer PC01, the sequence control program of the sequencer PC11 is provided with commands acting as a link circuit which makes the link element "L014" represent the same state as the input element "X100". The state of the link element "L014" belonging to the sequencer PC11 is transmitted to the address "3014" of the link element memory 254 in all other sequencers PCs through the data communication, and thus, the state of the input element "X100" belonging to the sequencer PC11 can be recognized by all other sequencers PCs each which looks up the state of the address "3014" of the link element memory 254 thereof in accordance with the sequence control program given thereto.

The states of the link element memory 254 in each sequencer are transmitted to all other sequencers through the link line L so as to be commonly stored in all the sequencers. Data transmitted to the link line L are defined in such a manner that for example, the start bit through tenth bit carry the link data (data indicating the states of the link elements) output from the sequencer PC01, the seven bits successive thereto carry the link data output from the sequencer PC11, and further successive eight bits carry the link data output from the sequencer PC12.

Link parameters shown in FIG. 5 are stored in the link parameter memory 255 of the RAM 25. The link parameters define at what timing and how many bits of data each of the sequencers should send out to the link line L, and also define at what timing and how many bits of data each of the sequencers should receive from the link line L. For example, the link parameters of the sequencer PC01 define 10 bits from start bit for data transmission, successive 20 bits for data reception from the link line L and further successive 10 bits for data reception as well.

Each sequencer PC incrementally changes the address having access to the link element memory 254 from "3000" one after another in a synchronous relation with the link parameter and determines based on the link parameter whether the address being presently accessed is to transmit data or to receive the same. And each sequencer PC sends out to the link line L the state of a link element being stored in the address for which it has been determined that data is to be sent out, and stores as the state of a link element the data received from the link line L, in the address for which it has been determined that data is to be received. Through data transmission executed in this manner, the corresponding addresses of the link memories 254 in all the sequencers PCs are able to store the same content at all the time.

The sequence control program executed by each sequencer PC is prepared on the presumption that all of the sequencers PCs have been linked within the system. Therefore, each sequencer PC does not operate correctly as programmed where another sequencer PC having link elements which belongs to such each sequencer PC is not linked. For example, where the sequencer PC11 is not linked within the system, the sequence control program of the sequencer PC01 cannot be executed as programmed. This is because the sequence control program of the sequencer PC01 is prepared to specify as input elements to itself link elements "L014" and "L016" of its link element memory 254, but because the states of these link elements "L014" and "L016" depend on the state data of the input elements "X100" and "X102" of the sequencer PC11 that the sequencer PC01 receives, as understood from FIG. 4.

According to the present invention, it becomes possible for the sequencer PC01 to execute the sequence control program therefor correctly even when the sequencer PC11 is not linked with the system. To this end, the CPU 10 in the programming device 1 executes processing for modifying the sequence control program of the sequencer PC01 for trial operation or maintenance purposes and for loading the modified sequence control program into the sequencer PC01 in accordance with flow charts shown in FIGS. 6 and 8. Prior to this operation, the operator designates the sequencer PC01 to the programming device 1 and through the same, causes the sequence control program which is to be executed in the sequencer PC01, to be transmitted from the floppy disk device 16 to the source program area 153 of the RAM 15. Then, a corresponding ladder diagram, e.g., as shown in FIG. 4 is stored in the ladder circuit diagram area 152 of the programming device 1.

Figure 6:
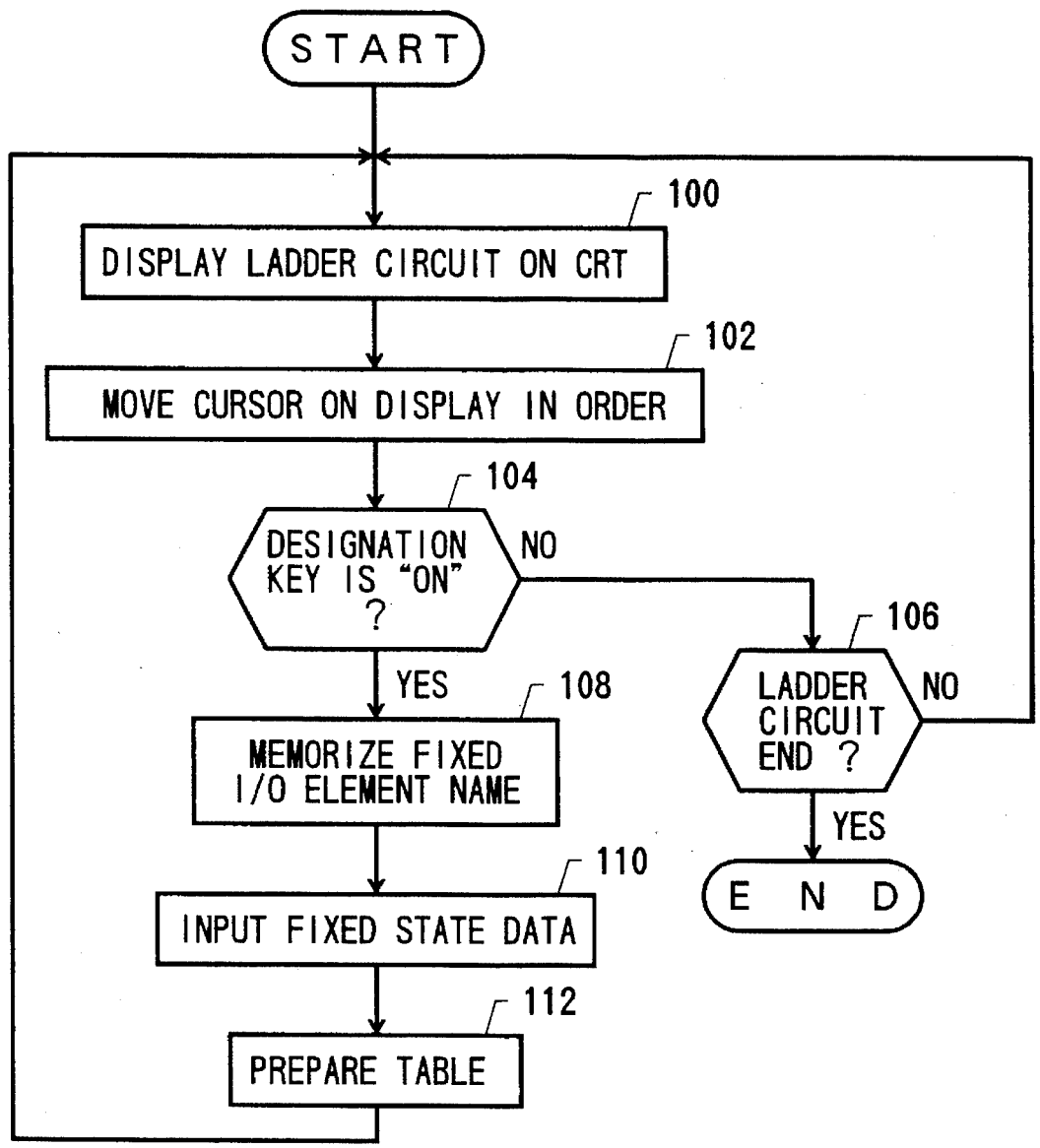
FIG. 6 is a flow chart showing the processing executed by a CPU of the programming device shown in FIG. 1 for designating I/O elements to either ON or OFF states.

FIG. 6 shows a flow chart executed by the CPU 10 of the programming device 1 for designating I/O elements and their states to be fixed.

In step 100, the sequence control program to be executed by the sequencer PC (in this particular instance, PC01) designated by the operator is displayed on the CRT 12 from the first line in the form of the ladder circuit diagram corresponding thereto, and in step 102, the cursor is moved to one of the displayed I/O elements. At this time, the operator can understand whether the I/O element is a link element received from another sequencer PC or not, by reference to an alphabetic symbol and a numeral suffixed to the I/O element. When the I/O link element is such a link element received from another sequencer and when the operator wishes the link element to be fixed, he pushes a designation key on the keyboard 13, with the cursor being located at the I/O element. In step 104, whether the designation key being pushed or not is judged, and if so, the code name of the I/O element to be fixed is stored in the I/O element designation area 151 of the RAM 15 in step 108. Next, in step 110, fixed state data indicating whether the designated I/O element is to be fixed to ON-state or to OFF-state is input from the keyboard 13, and in step 112, the code name of the fixed I/O element and its fixed state are stored in the fixed I/O element designation area 151 in the form of a table. Upon completion of designation of one I/O element, the processing returns to step 100, wherein the cursor is moved onto a successive I/O element, on which the designation or non-designation to the fixed state is carried out. When the I/O element is not designated to be one fixed in step 104, judgement is made in step 106 as to whether the sequence control program is ended or not. If not ended, the processing returns to step 100, wherein the designation or non-designation to the fixed state is carried out with respect to a successive I/O element. In this manner, the fixed I/O element designation table is prepared as shown in FIG. 7.

Although in the present embodiment, the designations of the I/O element and the states to be fixed are carried out separately in steps 104, 108 and 110, the step 110 can be omitted by providing two keys each of which acts for the designation of an I/O element and the designation to ON or OFF state so that the designations of the I/O element and the state can be done.

Figure 8:
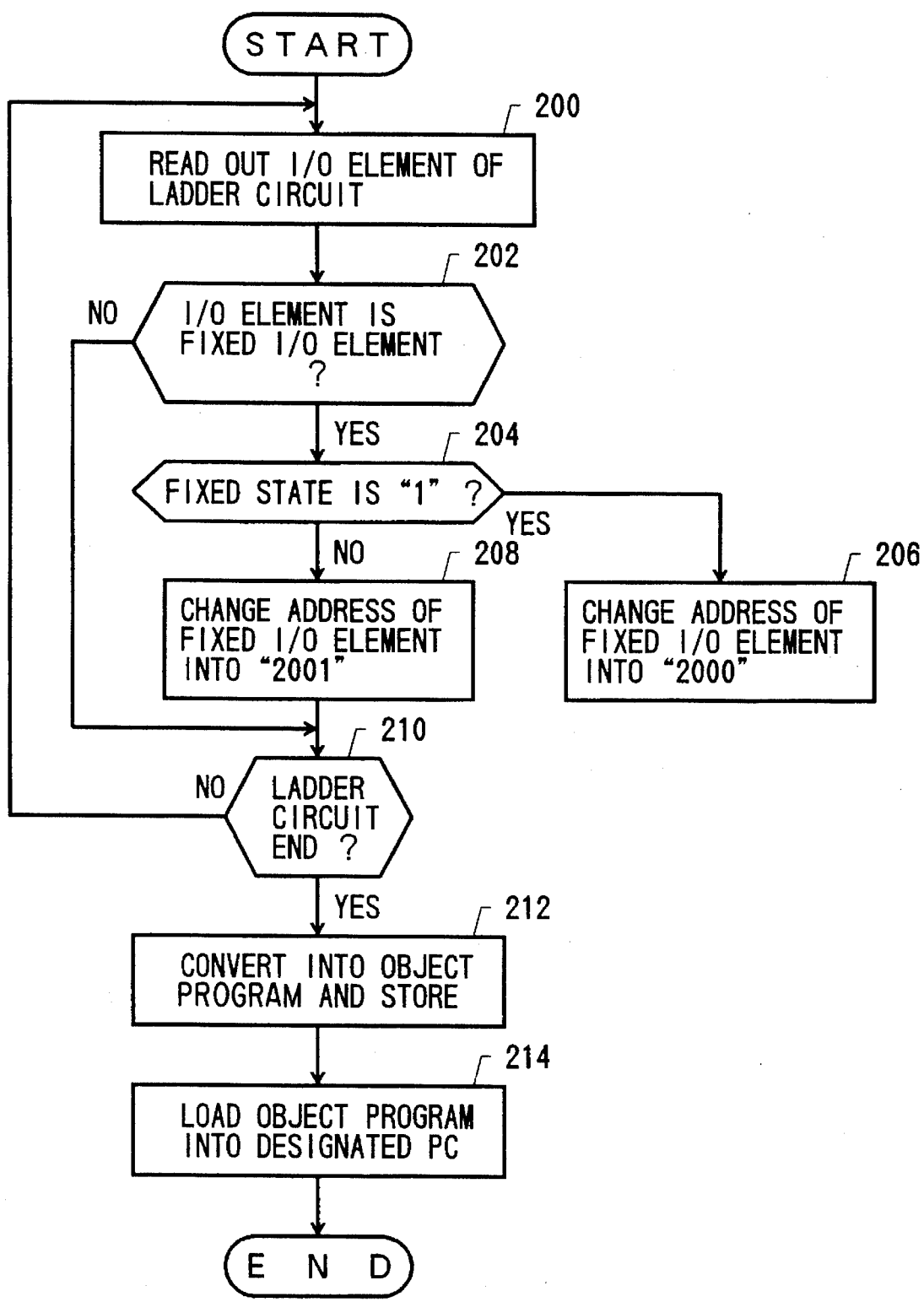
FIG. 8 is a flow chart showing the processing executed by the CPU for changing the address of an I/O element to a particular address storing fixed states and for converting a modified sequence control program into an object program.

Referring to FIG. 8, the processing executed by the CPU 10 of the programming device 1 for automatically preparing a modified sequence control program including the I/O elements designated to be fixed by the above-mentioned designation means will be described hereinafter.

In step 200, I/O elements included in the sequence control program stored as shown in FIG. 4 in the ladder circuit diagram area 152 are read out one after another. Next, in step 202, whether the read-out I/O element is the fixed I/O element or not is judged by searching for whether or not the read-out I/O element is registered in the fixed I/O element table stored in the fixed I/O element designation area 151. Next, in step 204, whether the fixed state of the read-out I/O element is ON-state or OFF-state is judged by reference also to the fixed I/O element table.

When the fixed state is ON-state "1", the address of the read-out I/O element is changed to the address "2000" of the ON-state internal relay memory 257. On the other hand, when the fixed state is OFF-state "0", the address of the read-out element is changed to the address "2001" of the OFF-state internal relay memory 258.

Figures 9, 10:
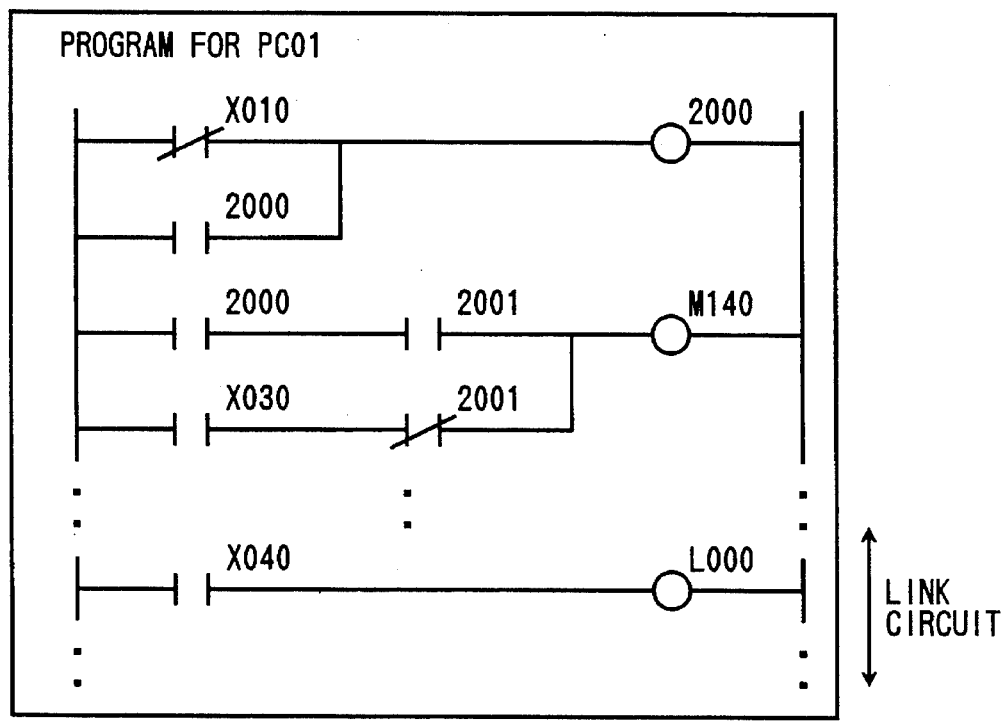
FIG. 9 is the ladder diagram representing the modified sequence control program.
FIG. 10 is a table showing a fixed state symbol area defined in the RAM.

Next, in step 210, judgement is made as to whether the read-out I/O element is of the last line of the sequence control program or not. If not of the last line, the processing returns to step 200 so as to read out a successive I/O element of the sequence control program. In this manner, until the reading out of the sequence control program is judged to have reached the last line in step 210, I/O elements are successively read out, wherein the address of the I/O element designated to be fixed is changed to the address of the ON-state internal relay memory 257 or of the OFF-state internal relay memory 258. As a result, as shown in FIG. 9, a revised or modified sequence control program in which the I/O elements "M123", "X150" and the link element "L014" are changed to "2000" while the I/O element "M200" and the link element "L016" are changed to "2001", is prepared.

In successive step 212, the modified sequence control program is converted into a corresponding object program, which is then stored in the object program area 154. The processing further advances to step 214, wherein the object program stored in the object program area 154 is loaded from the programming device 1 into the sequencer PC01 designated by the operator. Consequently, the sequencer PC01, when operated thereafter, executes the modified sequence control program shown in FIG. 9. During this operation, the I/O element "2000" is determined to be in ON-state "1" of the ON-state internal relay memory 257, while the I/O element "2001" is determined to be in OFF-state "0" of the OFF-state internal relay memory 258. As a result, even where the sequencer PC11 is not linked and where the states of the I/O elements "L014" and "L016" are uncertain, the sequencer PC01 which is in a relation interlocked with the sequencer PC11 can execute the sequence control program correctly as programmed.

Moreover, if necessary, I/O elements "M123", "X150" and "M200" belonging to the sequencer PC01 are fixed by the operator to ON-state or OFF-state, and even in this case, it is possible for the sequencer PC01 to execute the sequence control program correctly as programmed.

After the trial or maintenance operation, the system is operated with all the sequencers PCs thereof being interconnected with the link line L. To this end, prior to such a full-system operation, the sequence control program (object program) stored in the floppy disk device 16 for use in the full-system operation is loaded again into the sequencer PC01. Therefore, in advance of the full-system operation, it is unnecessary for the operator to restore the modified sequence control program used in the aforementioned trial or maintenance operation.

Figure 11:
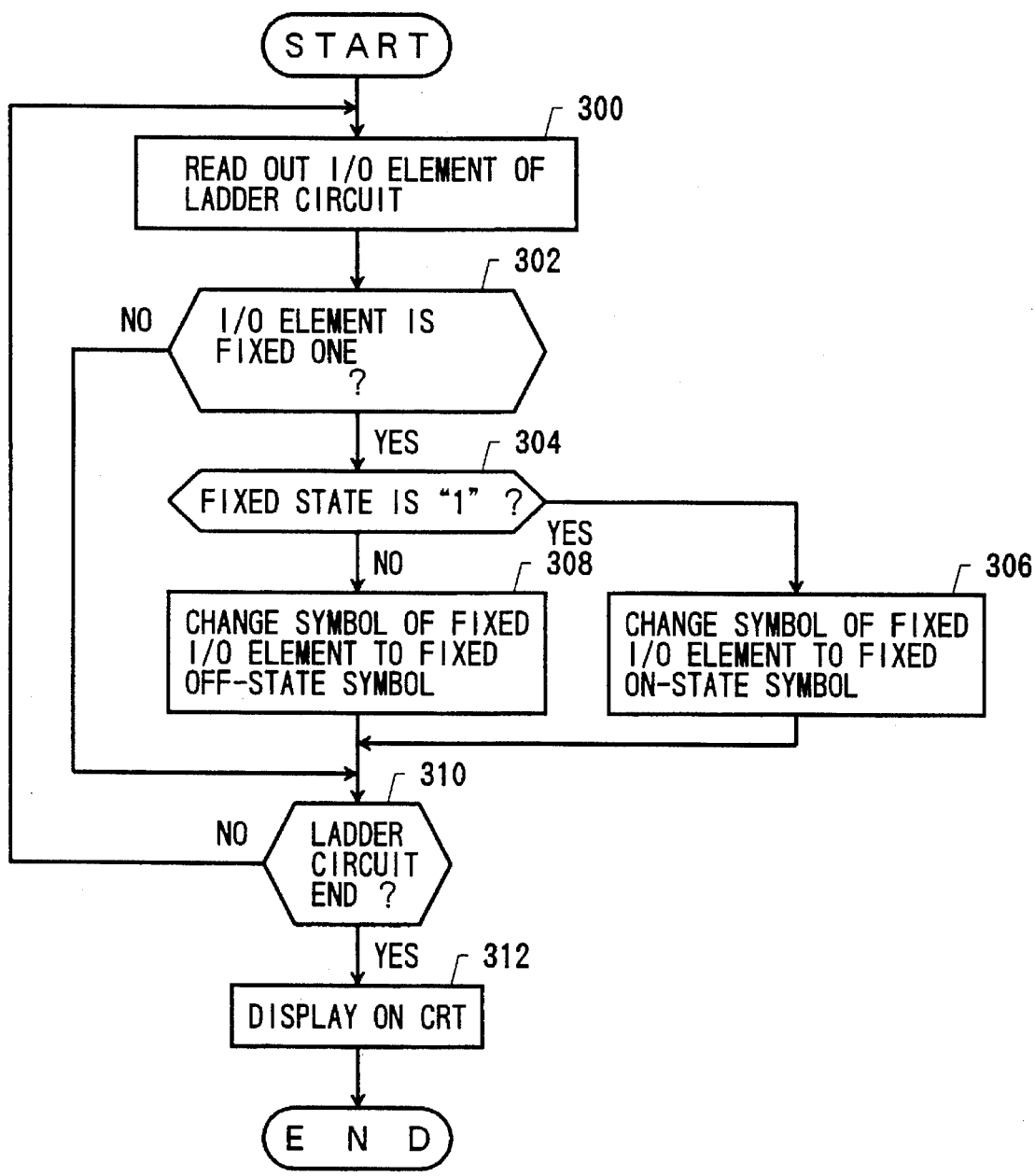
FIG. 11 is a flow chart showing a processing executed by the CPU for displaying a fixed I/O element in the form of a symbol indicating fixed state.

Further, the CPU 10 executes the processing according to a flow chart shown in FIG. 11 for displaying the sequence control program in such a manner that the I/O elements with the fixed states can be easily distinguished by the operator from others.

In step 300, the I/O elements in the sequence control program shown in FIG. 4 which is stored in the ladder diagram area 152 are read out one after another. In next step 302, judgement is made as to whether the I/O element is the fixed I/O element or the non-fixed I/O element, by making inquiry for whether or not, the read-out I/O element is registered in the fixed I/O element designation area 151. Thereafter, in step 304, further judgement is made as to whether the state of the read-out, fixed I/O element is in ON-state "1" or OFF-state, by reference to the fixed I/O element stored in the fixed I/O element designation area 151.

As shown in FIG. 10, symbolic data graphically representing I/O elements in the non-fixed state and symbolic data graphically representing I/O elements in the fixed ON-state or the fixed OFF-state are stored in the fixed state symbol area 156 of the RAM 15 in the form of a table. Further, the symbolic data for the I/O elements in fixed ON and OFF state are stored to be separated in terms of distinguishing the link elements from the non-linked elements.

When the fixed state of a read-out element is ON-state, the symbolic data for the fixed ON-state I/O element is read out from the fixed state symbol area 156 in step 306. The judgement of whether the read-out I/O element is a link element or not is carried out by reference to the table shown in FIG. 7, and the read-out I/O element specified in the sequence control program is changed to the symbolic data for the fixed ON-state. Similarly, when the fixed state of a read-out I/O element is OFF-state "0", the symbolic data for the fixed OFF-state I/O element is read out from the fixed state symbol area 156, and the read-out I/O element specified in the sequence control program is changed to the symbolic data for the fixed OFF-state in step 308.

Step 310 is then reached, wherein it is judged whether the read-out I/O element is that specified in the last line of the sequence control program. If not of the last line, the processing returns to step 300, wherein a successive I/O element specified in the sequence control program is then read out. In this manner, the symbolic data for any I/O element to be fixed is changed to the symbolic data which graphically represents the fixed state of such any I/O element.

Figure 12:
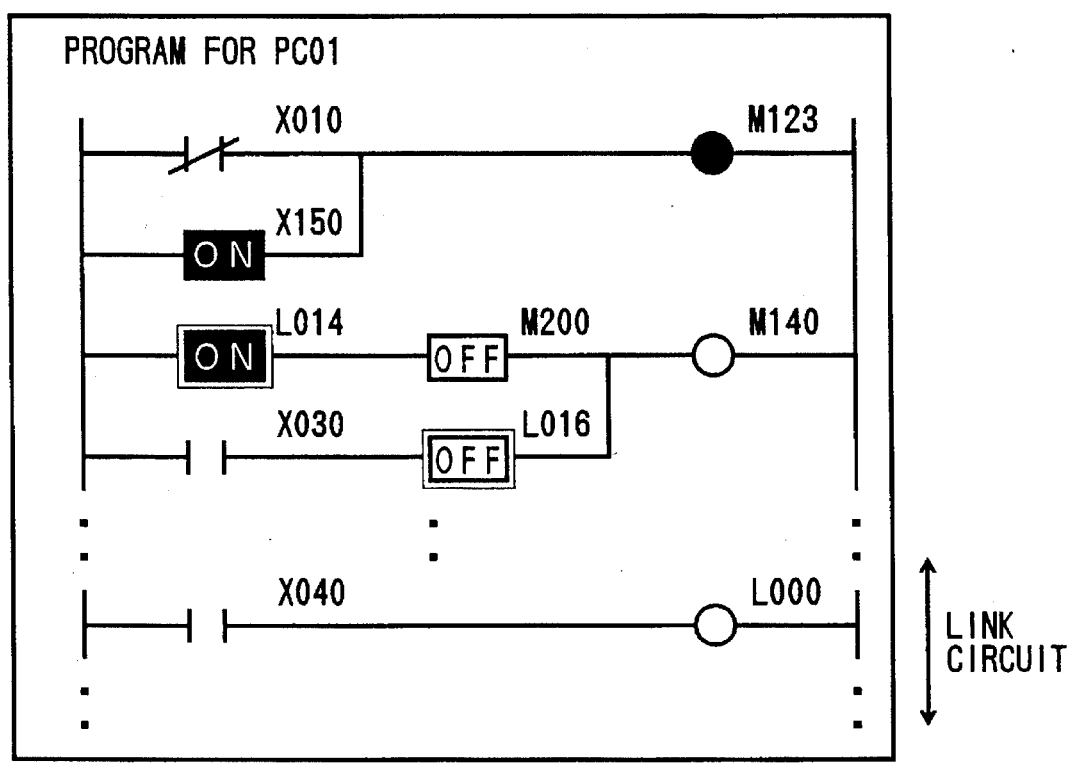
FIG. 12 is a modified ladder diagram of that shown in FIG. 9 after the processing according to the flow chart shown in FIG. 11.

In next step 312, the sequence control program now having been converted into the symbolic data is displayed on the CRT 12 as shown in FIG. 12. Therefore, the operator can easily understand what I/O elements have been designated to the fixed state, at a glance of the graphics on the CRT 12 and can easily observe the operation of the system.

Although the programming device 1 in the foregoing embodiment carries out the modification of a sequence control program for a desired one of the sequencer PCs and the transmission of an object program corresponding to the modified program to the desired sequencer, with the programming device 1 itself being linked with the desired sequencer to be tested or maintained as shown in FIGS. 1 and 3, such modification and transmission may of course be carried out with the programming device 1 being linked with the link line L, as shown by the broken line in FIG. 2.

Obviously, numerous modifications and variations of the present invention are possible in light of the above teachings. It is therefore to be understood that within the scope of the appended claims, the present invention may be practiced otherwise than as specifically described herein.

What is claimed is:

1. A programming device connectable to a plurality of programmable sequence controllers for preparing a sequence control program to be executed by one of any one of said programmable sequence controllers, said programming device comprising:

first program memory means for storing the sequence control program for said one of any one of said sequence controllers, said sequence control program including I/O elements of said one of any one of said programmable sequence controllers, said sequence control program also including I/O elements of others of said programmable sequence controllers, the states of whose elements are input via a link line connecting all of said programmable sequence controllers;

display means for visibly displaying the control program in the form of a ladder diagram;

program read-out means for reading out the sequence control program from the first program memory means so as to display the sequence control program on the display means;

designation means for enabling an operator to designate an I/O element of said others of said programmable sequence controllers being displayed and to fix the state of the designated I/O element to either ON or OFF state so as to prepare a modified sequence control program; and second program memory means for storing the modified sequence control program.

2. A programming device as set forth claim 1, wherein said designation means includes;

a first state memory area storing ON-state, a second state memory area storing OFF-state; and address changing means for changing the address of the I/O element to be fixed to either of the first and second state memory area.

3. A programming device as set forth claim 1, wherein said display means further comprises:

fixed-state symbol display means for graphically displaying I/O elements being displayed in such a manner for the operator to distinguish I/O elements to be fixed from other I/O elements not to be fixed.

4. A programming device as set forth claim 1, further comprising:

program converting means for converting the modified sequence control program into a corresponding object program; and program loading means for loading the object program to the sequence controller, with the programming device being connected to the sequence controller, so as to make the same execute the modified sequence control program.

5. A programming device as set forth claim 1, wherein said designation means further comprises:

fixed I/O element storage means for storing the fixed I/O elements and the states fixed thereof.

6. A programming device as set forth claim 1, wherein the first program memory is capable of storing sequence control programs respectively used by all of programmable sequence controllers interconnected through a link line.

* * * * *